Figure 1:
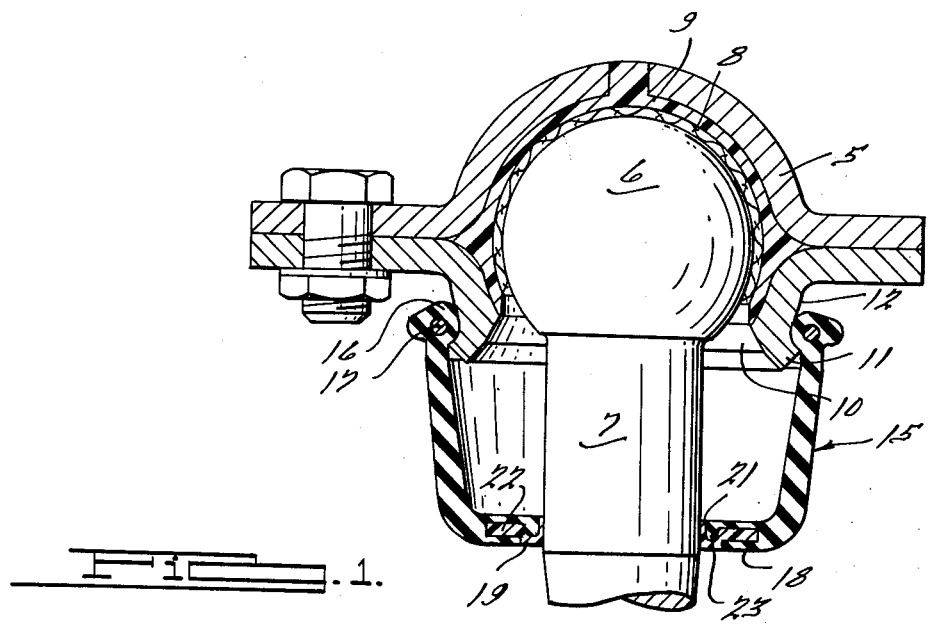

INVENTOR.
Paul P. Thomas
BY
Harness, Dickey & Pierce
ATTORNEYS.

United States Patent Office 3,164,389
Patented Jan. 5, 1965

3,164,389
SEAL FOR BALL JOINT STUD
Paul P. Thomas, Detroit, Mich., assignor to American Metal Products Company, Detroit, Mich., a corporation of Michigan
Filed Nov. 22, 1960, Ser. No. 71,031
2 Claims. (Cl. 277—212)

This invention relates to seals and particularly to a seal having a flexible lip of low friction material.

Difficulty has been experienced when attempting to seal a cylindrical rod, stud or the like against the entrance of moisture and grime when in engagement therewith. Rubber and rubberlike materials dragged upon the surface and became scuffed and worn and after a period of time could no longer seal the surface. One or more rings of a hard material were used but these also leaked moisture and grime and could not be relied upon to retain a sealing engagement over a substantial period of time.

The present invention pertains to a seal made as a sleeve of a low friction resin material having flanges extending at right angles to each other. One of the flanges is of cylindrical shape while the other is of washerlike construction. Both of the flanges are engaged by a resilient material, such as rubber, which supports the seal. The cylindrical flange snugly engages the surface of the rod, stud or the like against which it is urged by the rubber material. The seal is made from a low friction resin material such as nylon, polyethylene, Teflon and the like. Substantially no wear will occur to the material of the seal and no resistance to relative rotation will be present. The seal itself embodies a cylindrical flange portion, the bottom of which is flanged outwardly and from which an outward, upwardly offset flange extends. A cup-shaped element of rubber or other resilient material has an upper end which moves over a flange into a recess of a retaining member to form a seal therewith. The aperture through the central sealing member extends over a rod, stud, shaft or the like, which has relative rotation therewith. The bottom of the cup is molded on both sides of the washerlike flange portion and extends into a recess adjacent to the bottom of the cylindrical flange portion for urging the latter against the cylindrical surface to be sealed. The cylindrical flange portion may have the upper half tapering to have the material thereof disposed under tension when expanded upon being applied to the rod, stud, shaft or the like. This provides an additional pressure between the sealing surface of the cylindrical flange and the surface of the element extending therethrough to assure a tight seal at all times.

Accordingly, the main objects of the invention are: to provide an enclosing element for an area about a shaft which is engaged by a cylindrical flange portion thereof; to provide a cup-shaped rubberlike element with a sealing member having a central cylindrical wall portion which engages the surface of the cylindrical element which extends therethrough; to provide a seal having a washerlike flange embedded in the material of a cup-shaped enclosing element which encloses an area about a shaft engaged by a cylindrical flange of the seal; to provide a cup-shaped enclosing element with a seal having an annular flange embedded therein and a central cylindrical flange, the inner portion of which is tapered to tension the material thereof when in engagement with a cylindrical element, and, in general, to provide a seal for a cylindrical element which is simple in construction, which produces a positive seal, and which is economical of manufacture.

Figure 2:
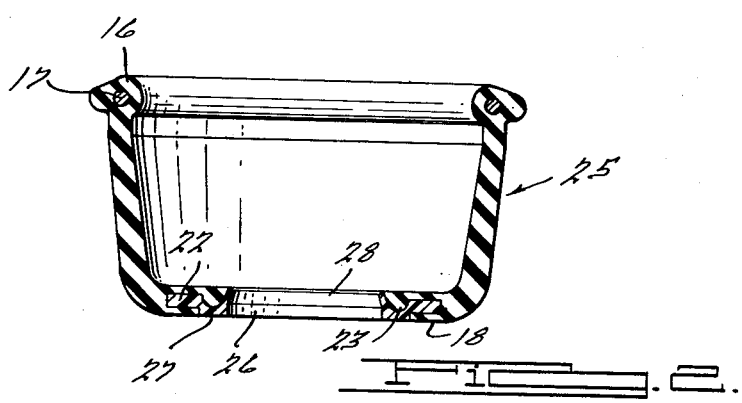

Other objects and features of novelty of the invention will be specifically pointed out or will become apparent when referring, for a better understanding of the invention, to the following description taken in conjunction with the accompanying drawing, wherein:

FIGURE 1 is a sectional view of a ball joint having an enclosing element therefor containing a seal disposed over the stud and open end thereof which embodies features of the present invention, and FIG. 2 is an enclosing element having a seal similar to that illustrated in FIG. 1, showing a modified form thereof.

While it is to be understood that the seal of the present invention may be applied to any cylindrical element which requires the surfaces thereof to be sealed, the illustration and description of the seal as being applied to a ball joint are by way of example and not limitation. The ball and socket joint herein illustrated comprises a polished ball 6 having a generally cylindrical stud 7 extending downwardly from the bottom opening in a socket 5. A low friction layer of material 8 is forced about a ball by backing material 9 which may be compressed rubber or a hardened resin which was injected or otherwise placed between the material 8 and the inner surface of the socket to which it is anchored. The central opening 10 of the socket is formed by a round flange 11 flared outwardly to provide an annular recess 12 about the opening. It is desirable to have a seal over the open end of the socket to prevent the entrance of moisture and grime thereinto and into the area between the ball and material 8 to avoid damage to the engaged surfaces.

A cuplike sealing element 15 of rubber or the like has a boss 16 around the upper edge reinforced by a wire or cord 17. The bottom 18 of the element 15 supports a sealing member 19 in the center thereof which provides an opening through which the stud 7 extends, as clearly illustrated in FIG. 1. The annular sealing member 19 is made of a low friction material, preferably a resin material, such as nylon, polyethylene, Teflon and the like. The seal is shaped to have a substantially uniform thickness throughout and embodies a cylindrical flange portion 21 and a radially extending annular flange the outer peripheral portion 22 of which is offset axially, upwardly as shown, from the inner portion of said radial flange. With this construction, a recess 23 is present between the upwardly offset flange portion 22 and the cylindrical flange portion 21, providing greater flexibility to the latter. The material of the cup-shaped sealing element 15 is made of rubber or resilient plastic material which, when disposed on opposite sides of the washerlike flange portion 22, securely supports the sealing member 19 thereon. When the material is disposed within the recess 23, it backs up the cylindrical flange portion 21 and applies a pressure thereto to assist in retaining it in sealing contact with the surface of the stud 7.

A similar cup-shaped sealing element 25 is illustrated in FIG. 2 which is the same as that illustrated in FIG. 1, with the exception that the inner cylindrical surface 26 of the sealing member 27 has a taper on the inner half 28 thereof. The tapered portion is expanded when the member 27 is drawn over the stud 7 and produces a pressure which maintains a tight engagement between the surface of the cylindrical flange portion 28 and that of the stud 7. It is to be understood that the cylindrical tapered portion 28 could extend below the bottom of the sealing member 27 so as to be readily expanded when a taper is not present on the stud 7 and the stud is inserted therein from the top.

What is claimed is:

1. A sealed assembly comprising in combination: a generally cylindrical member and a round member surrounding said generally cylindrical member in spaced relationship thereto; an annular member of an organic polymeric material having a generally cylindrical flange portion sealingly engaging said generally cylindrical member, an annular flange extending radially outwardly from said cylindrical flange adjacent one end thereof, said annular flange having an axially offset outer peripheral portion thereby providing an annular recess between said offset flange portion and said cylindrical flange; and a resilient generally cup-shaped member having a portion at one end thereof sealingly engaging said round member and a portion at the other end thereof embedding said offset flange portion and extending into said recess and against said cylindrical flange portion to assist in biasing said cylindrical flange portion into its sealing engagement with said generally cylindrical member.

2. A sealing assembly for forming a seal with a cylindrical member comprising, in combination, a resilient cup-shaped member surrounding said cylindrical member, an annular sealing member of organic polymeric material having a generally cylindrical flange portion adapted to sealingly engage said cylindrical member, and an annular flange extending radially outwardly from said cylindrical flange portion, said annular flange having a radially inner portion joined with and located relative to said cylindrical flange portion to define an annular recess of generally U-shaped section between said cylindrical flange portion and said annular flange, said annular flange being imbedded in said resilient member with the latter extending into said annular recess and against said cylindrical flange portion to assist in biasing the latter into sealing engagement with said cylindrical member.

References Cited in the file of this patent

UNITED STATES PATENTS

| | | |
|---|---|---|
| 1,372,760 | Loudenbeck | Mar. 29, 1921 |
| 2,159,825 | Stevens | May 23, 1939 |
| 2,736,585 | Riesing | Feb. 28, 1956 |
| 2,823,720 | Svec et al. | Feb. 18, 1958 |
| 2,968,498 | Saunders | Jan. 17, 1961 |
| 2,971,787 | Lincoln | Feb. 14, 1961 |

FOREIGN PATENTS

| | | |
|---|---|---|
| 1,179,325 | France | Dec. 22, 1958 |